US00RE40001E

(19) United States
(12) Reissued Patent
Siegler et al.

(10) Patent Number: US RE40,001 E
(45) Date of Reissued Patent: Jan. 15, 2008

(54) JACK SHAFT GARAGE DOOR OPERATOR

(75) Inventors: Mark D. Siegler, Brookfield, IL (US); James S. Chang, Arlington Heights, IL (US); David J. Miller, Arlington Heights, IL (US)

(73) Assignee: The Chamberlain Group, Inc., Elmhurst, IL (US)

(21) Appl. No.: 09/547,563

(22) Filed: Apr. 12, 2000

Related U.S. Patent Documents

Reissue of:
(64) Patent No.: 5,743,046
Issued: Apr. 28, 1998
Appl. No.: 08/829,742
Filed: Mar. 31, 1997

U.S. Applications:
(63) Continuation-in-part of application No. 08/456,874, filed on Jun. 1, 1995, now abandoned.

(51) Int. Cl.
*E05F 11/00* (2006.01)

(52) U.S. Cl. ..... 49/199; 49/322
(58) Field of Classification Search ..... 49/197, 49/198, 199, 200, 201, 322; 160/186, 188, 160/200, 201, 202
See application file for complete search history.

(56) References Cited

U.S. PATENT DOCUMENTS 1,216,202 A * 2/1917 Boughton
1,417,104 A * 5/1922 Pachesa ..... 160/303
1,465,695 A * 8/1923 Stewart (Continued)

FOREIGN PATENT DOCUMENTS

EP 151 427 A * 8/1985
EP 151427 * 8/1985 ..... 49/322
FR 2 634 815 A3 * 2/1990

OTHER PUBLICATIONS

Designer's Notebook, *Six Ways to Reduce Costs with Trantorque Keyless Bushings*. Fenner Manheim, Manheim, PA.*
Brochure, *Trantorque*, Fenner Manheim, Manheim, PA.*
Installation Instructions, *Cable Keeper*, Set–Rite Seal Co., Levittown, PA.*
Garage Door Opener Owner's Manual, Series 651–2MM–1/2HP, Series 601MM–1/2HP, Series 151MM–1/4HP, The Chamberlain Group, Inc., published 1993.*
Lift Master Model MJ Series 1000 Commercial Operator Medium Duty Jack Shaft Operator, published by The Chamberlain Group, Inc. more than one year before Jun. 1, 1995.*
Model GJ Series 3000 Commercial Operator Gear Head Jack Shaft Operator, published by The Chamberlain Group, Inc. more than one year before Jun. 1, 1995.*
"Instructions for Installaton of 139.53709 Quick Turn Brackets," Document No. 114A798, published by the Chamberlain Group, Inc. more than one year before Jun. 1, 1995.*

(Continued)

*Primary Examiner*—Jerry Redman
(74) *Attorney, Agent, or Firm*—Fitch, Even, Tabin & Flannery

(57) ABSTRACT

A jack shaft garage door operator for opening and closing a movable garage door has a drive containing an electric motor. A rotatable jack shaft is connected to the drive unit to be driven thereby. A pull-up cable drum is connected to and driven by the jack shaft. A pull-up cable extends from the drum about which it is wound and connects to a bottom part of the garage door to raise the door. A pivoting arm is mounted near the jack shaft and provides tension to the cable. A shaft lock hub mounted on the jack shaft is engaged and locked by the arm if the tension in the cable drops. A stop is mounted on the garage door for engagement by the movable arm in the event that the door is opened without the cable being drawn in the cable drum.

9 Claims, 2 Drawing Sheets

U.S. PATENT DOCUMENTS

| | | | | | |
|---|---|---|---|---|---|
| 1,863,961 | A | * | 6/1932 | Ball et al. | 160/189 |
| 2,096,251 | A | * | 10/1937 | Knight et al. | 74/407 |
| 2,185,828 | A | * | 1/1940 | Blodgett | 20/19 |
| 2,580,311 | A | * | 12/1951 | Matchett | 268/59 |
| 2,841,724 | A | * | 7/1958 | Brown | 310/76 |
| 2,882,044 | A | * | 4/1959 | Ginte | 268/59 |
| 3,147,001 | A | * | 9/1964 | Purdy | 268/59 |
| 3,311,159 | A | * | 3/1967 | Stansberry | 160/189 |
| 3,412,780 | A | * | 11/1968 | Moler | 160/191 |
| 3,685,567 | A | * | 8/1972 | Pemberton et al. | 160/8 |
| 3,785,089 | A | * | 1/1974 | Smith | 49/139 |
| 3,934,635 | A | * | 1/1976 | Kin | 160/189 |
| 4,085,629 | A | * | 4/1978 | Fogarollo | |
| 4,202,644 | A | * | 5/1980 | Soussloff | 403/369 |
| 4,241,540 | A | * | 12/1980 | Depperman | 49/199 |
| 4,274,227 | A | * | 6/1981 | Toenjes | 49/28 |
| 4,356,668 | A | * | 11/1982 | Wagner | 49/506 |
| 4,385,471 | A | * | 5/1983 | Gabry et al. | 49/322 |
| 4,460,030 | A | * | 7/1984 | Tsunemura et al. | 160/35 |
| 4,472,910 | A | * | 9/1984 | Iha | 49/139 |
| 4,520,591 | A | * | 6/1985 | Calvagno | 49/322 |
| 4,538,661 | A | * | 9/1985 | Henry et al. | 160/35 |
| 4,597,224 | A | * | 7/1986 | Tucker | 49/199 |
| 4,597,428 | A | * | 7/1986 | Iha | 160/188 |
| 4,621,452 | A | * | 11/1986 | Deeg | 49/28 |
| 4,653,565 | A | * | 3/1987 | Iha et al. | 160/193 |
| 4,956,938 | A | * | 9/1990 | DeMent | 49/199 |
| 5,064,147 | A | * | 11/1991 | Noble et al. | 244/129.5 |

OTHER PUBLICATIONS

"ATL Rolls Out the Best Warranty in the Industry," Arrow Tru–Line INc., published more than one year before Jun. 1, 1995.*

"Posi–Tension Drums . . . One of the Many Reasons Why You Should Be Getting 'The Original' . . . 'Overhead Door'", published more than one year before Jun. 1, 1995.*

"SpecData", from Door Oper. & Remote Controls Mfs. Assn. & Nat'l Assn. of Garage Door Mfs., Nov. 1983 (supersedes Feb. 1977).*

"Architectural Specifications", manufactured by Link Controls, 2111 Lakeland Ave., Ronkonoma, NY 11779.*

* cited by examiner

JACK SHAFT GARAGE DOOR OPERATOR

Matter enclosed in heavy brackets [ ] appears in the original patent but forms no part of this reissue specification; matter printed in italics indicates the additions made by reissue.

This application is a continuation of application Ser. No. 08/456,874 filed Jun. 1, 1995, now abandoned.

BACKGROUND OF THE INVENTION

The invention relates in general to garage door operators and in particular to a jack shaft garage door operator having a pivoting arm for preventing cable associated with a pull-up cable drum from becoming slack during the operation of the door and for providing a positive door locking system.

One of the problems associated with jack shaft garage door operators is that while they are compact and may be conveniently used in garages which have little overhead room, they may present problems to the owners of the garage in that the cable may be payed out allowing the door to close under its own weight and if the door stalls or if the cable pay out drum rotates too far, the tension in the cable will drop and the cable may come off the drum necessitating a visit from a repairman.

In addition, the jack shaft garage door operator does not provide any secure locking facility other than a lock at the bottom of the door, which may be tampered with by a burglar. If the door is not locked by some other means, the bottom lock may be forced or damaged and the door can be lifted open and the garage entered by an intruder.

U.S. Pat. No. 3,785,809 discloses a door operator having a winch member built into a tilting door and movable with it. A cable is attached to a wall member supporting the door and another end of the cable is connected to an extensible arm.

U.S. Pat. No. 2,185,828 discloses a catch for stopping a door from falling in the event that a sustaining cable or a counterbalance fails or breaks.

U.S. Pat. No. 4,385,471 discloses a door including a stopping member having a clip connection 29 which engages a cable. If the cable breaks, as shown in FIG. 4, the arm 27 rotates outwardly bringing a cam dog 26 having a plurality of teeth 32 into locking engagement with a roller 13a to prevent the roller 13a from moving, thereby suspending the door in position.

U.S. Pat. No. 4,520,591 to Calvagno discloses a system that is mechanically responsive to a break in a cable to prevent a door from falling.

French Patent No. 2634-815-A includes an "antidrop" safety mechanism having a cam plate 21 on either side of the door equipped with a convex toothed edge to engage a bracket in case of door suspension failure. None of the aforementioned documents teach or disclose solutions for preventing a door from being opened or from stopping an operation of a garage door operator to cause it to reverse to take up cable which may have inadvertently been payed off a cable drum of a jack shaft door operator.

What is needed then is an improved jack shaft garage door operator that avoids unwanted problems with the cable coming off the drum and provides security for the user.

SUMMARY OF THE INVENTION

A jack shaft garage door operator is useful for opening [a] *and* closing a movable garage door. The jack shaft garage door operator embodying the present invention includes a drive unit having an electric motor therein for driving a jack shaft. The jack shaft is mounted above a door opening and usually has coupled to it a spring, or the like, for providing a restoring force to the jack shaft to help raise the door and to support a portion of the weight of the door that is not supported by the L-shaped rails that a door usually rides in. A pull-up cable drum is connected to the jack shaft to be rotated thereby and has a multi-strand steel pull-up cable connected thereto that may be payed out to lower a door or wound up to raise the door. The pull-up cable is typically connected to a bottom portion of the door and, when wound up, will cause the door to rise along vertical portions of L-shaped rails. A pivotable arm is mounted on the garage near the jack shaft and includes an arm extension having a rounded surface which may be a roller or may be fixed for engaging the multi-strand steel pull-up cable. The pivotable arm, including the cable engaging portion, is biased by a spring causing the cable engaging portion to maintain the cable under tension in the drum. In the event that the cable is inadvertently payed out, for instance, by the door having reached the bottom of its travel and the operator continuing to run, the pull-up arm is allowed to pivot upwardly by reduced tension in the cable and swings far enough upward that an operator arresting dog comes in contact with a toothed wheel mounted upon the jack shaft causing the garage door operator to stall. The garage door operator is otherwise a conventional garage door operator and when in a stalled condition, automatically reverses, causing the cable to be payed in and the door to be opened. Thus, the pivotable arm prevents the cable from coming off the cable drum. In addition, a stop or means for preventing the garage door from opening in the form of a metal plate is bolted on an upper panel of the garage door and, when in the closed position, is immediately beneath the pivoting arm of the cable when it is pulled downwardly by full tension on the cable. If the door is attempted to be breached, for instance by an intruder attempting to lift the door, the cable becomes slack allowing the pivoting arm to come out slightly so that it then engages compressionally the stop plate on the garage door thereby preventing further upward motion of the garage door.

It is a principal aspect of the present invention to provide a jack shaft garage door operator having a mechanical cable tension sensor for providing door reversal before a cable pays off a cable drum.

It is another aspect of the present invention to provide a jack shaft garage door operator having a door opening block adapted to engage a pivoting arm to prevent a door from being forced open.

Other advantages of the invention will become obvious to one of ordinary skill in the art upon a perusal of the following specification and claims in light of the accompanying drawings.

DETAILED DESCRIPTION OF THE PREFERRED EMBODIMENT

Figure 1:
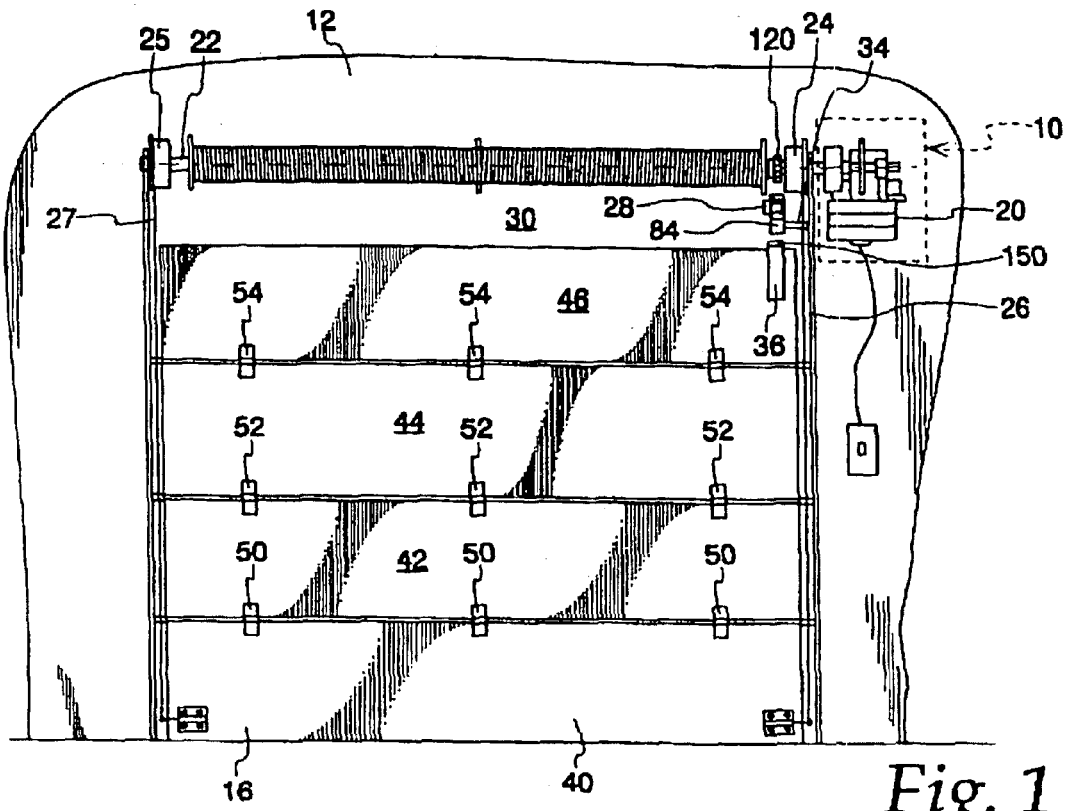
FIG. 1 is an elevational view of a portion of a garage having a garage door in a closed position with a jack shaft garage door operator associated therewith and embodying the present invention.

Referring now to the drawings and especially to FIG. 1, a jack shaft garage door operator embodying the present invention and generally identified by numeral 10 is shown therein. The jack shaft garage door operator 10 is mounted on a garage 12 near a garage door opening 14 which has associated with it a movable multiple panel garage door 16.

The jack shaft garage door operator 10 includes a drive unit 20 having a jack shaft 22 coupled thereto to be turned thereby. A pull-up cable unit 24 is mounted on the jack shaft 22 to be turned and a pull-up cable 26 is wound around the cable drum 24 to be pulled upwardly. A pivotable arm assembly 28 is mounted on a header 30 of the garage 12 immediately above the door opening 14 adjacent the jack shaft 22 and includes a cylindrical cable engaging member or cable tensioner arm 34 for engaging the pull-up cable 26 and ending in a cable retaining knob 35 for preventing the pull-up cable 26 from sliding off the tensioner arm 34. A door lock bracket or means 36 for preventing the garage door from opening is mounted on the garage door 16.

Figure 2:
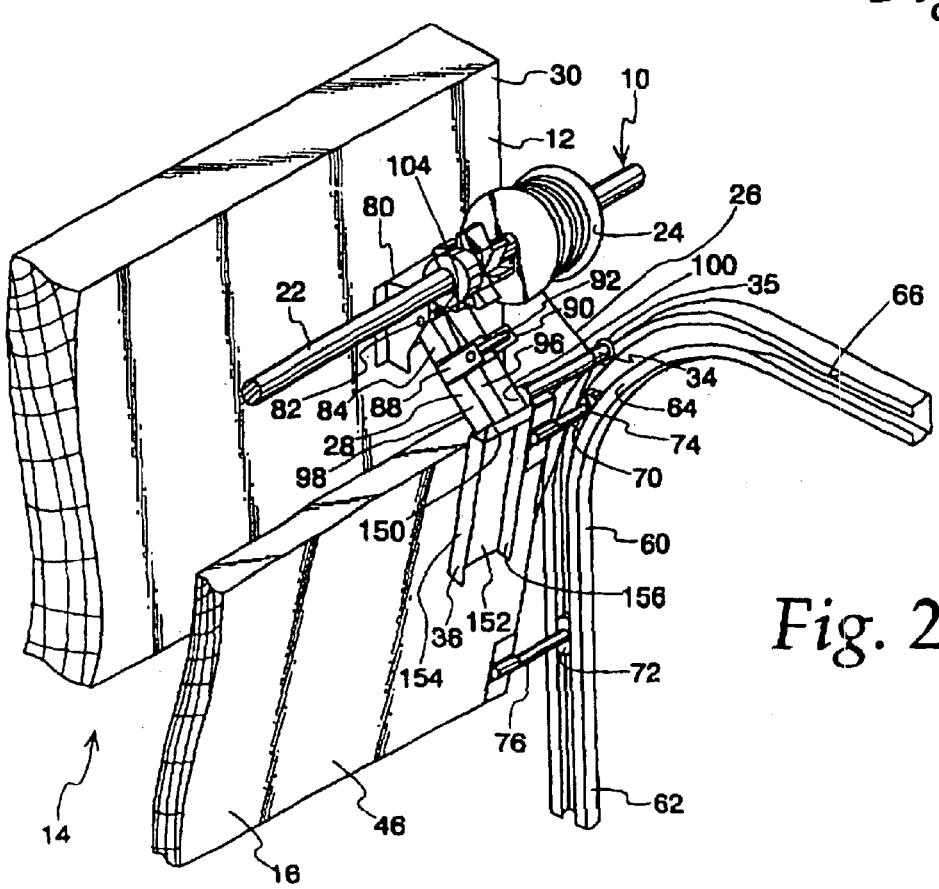
FIG. 2 is an enlarged isometric view having portions broken away to show details of a portion of the jack shaft garage door operator shown in FIG. 1.
Figure 3:
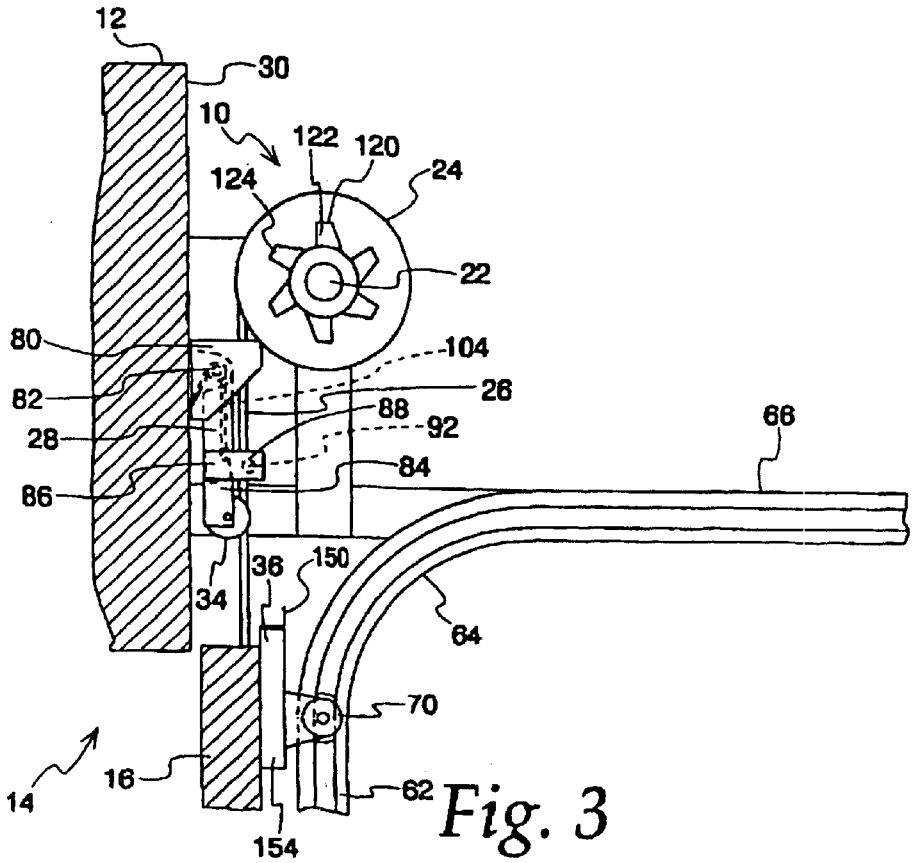
FIG. 3 is a side elevational view of a portion of the jack shaft garage door operator shown in FIGS. 1 and 2 with the garage door positioned in a closed position.
Figure 4:
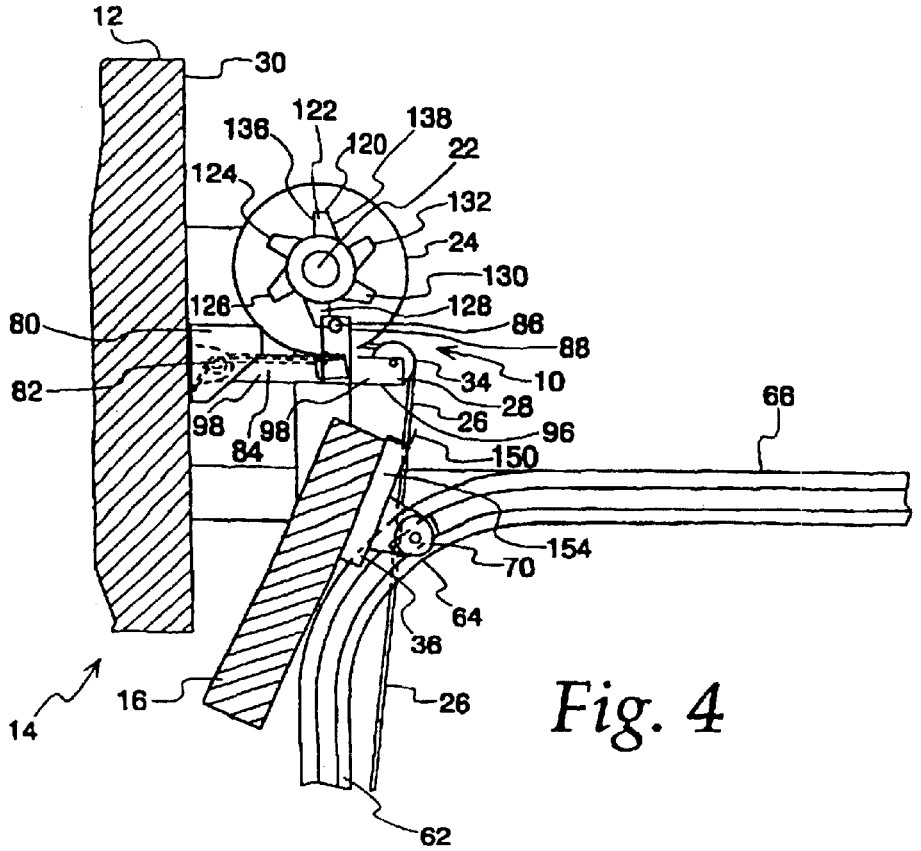
FIG. 4 is a side elevational view, partially in section, showing a cable tensioning meter of the jack shaft garage door operator positioned to take up slack in a pull-up cable.

More particularly, the garage door 16 is a multiple paneled door consisting of a plurality of rectangular panels 40, 42, 44 and 46. The panels 40 and 42 are connected by a plurality of hinges 50. Panels 42 and 44 are connected by a plurality of hinges 52. Panels 44 and 46 are connected by a plurality of hinges 54. The door is carried on a pair of rollers in a pair of L-shaped tracks, details of one of which are shown in FIGS. 2 through 4. The exemplary L-shaped track 60 shown in FIG. 2 includes a vertical portion 62, a curved portion 64 and a horizontal portion 66. Rollers 70 and 72 positioned on respective shafts 74 and 76 mounted to the door panel 46 ride in the track 60 and carry the door panel upwardly and downwardly. In operation, when the door 16 is lowered, the jack shaft 22 is rotated to pay out the cables 26 and 27 from the pull-up cable drums 24 and 25.

The pivoting arm assembly 28 includes a base plate assembly 80 mounted on the header 30 and a pivot 82 which supports a pivotable arm 84. The pivotable arm 84 includes a bracket-type stop member 86 having wall portions 88 and 90 supporting a cross bar 92. The pivoting arm 28 includes a bottom wall 96 and a pair of sidewalls 98 and 100 for providing strength thereto, in particular, compressional strength. The arm 84 is biased outwardly and upwardly by a spring 104 and is normally held in a substantially vertical position as shown in FIG. 3 by tension in cable 26 when only a sufficient amount of cable 26 has been payed out so that the door is either partially supported by cable 26 or has been closed without additional cable 26 having been payed out. In the event that, for whatever reason, the drum 24 continues to turn, additional cable 26 is payed out and the arm 84 tends to pivot upwardly until it reaches a substantially horizontal position as shown in FIG. 4. At that point the cross bar 92 engages a shaft lock hub comprising a toothed wheel 120 having a plurality of detents or teeth 122, 124, 126, 128, 130 and 132 formed thereon and thereby prevents further turning of the jack shaft 22, stalling the drive unit 20 which causes the drive unit 20 to automatically reverse, pulling the cable 26 back in and swinging the arm away from the cog wheel 120. In addition, it should be noted that the cog wheel 120 has asymmetric cogs with perpendicular edges as exemplified by cog 120 with perpendicular edge 136 and sloping edge 138 allowing the jack shaft 22 to rotate upwardly despite the cross-bar 92 being in engagement with the teeth 120 while preventing downward rotation.

In addition, if the drive unit 20 is stopped and the door 16 is attempted to be opened, in other words it is forced upward as shown in FIG. 2, the cable 26 becomes slack allowing the cable arm to pivot outwardly, as shown in FIG. 2, sufficiently so that it engages the stop 36, more specifically a stop lip 150 thereof. The stop 36 also includes a base wall 152 and a pair of sidewalls 154 and 156 for providing strength so that the stop lip 150 is not deformed by being brought into compressional engagement with the movable arm 84. In addition, since the movable arm 84 is substantially trough shaped with sidewalls 98 and 100 providing strength to the base wall 96, the compressional engagement will not tend to crush the arm and will prevent the door 16 from rising farther.

Thus, what has been provided is a mechanical device for providing security for a garage door by preventing the garage door from being inadvertently opened while also preventing cable from being accidentally payed off the drums 24 and 26 which would necessitate an expensive repair call.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A jack shaft garage door operator for opening and closing a movable garage door, comprising:

a drive unit;

a jack shaft coupled to the drive unit to be turned thereby;

a pull-up cable drum connected to the jack shaft to be driven thereby;

a pull-up cable for connection to a movable garage door and connected to the pull-up cable drum to be raised and lowered thereby;

a pivotable arm mounted in proximity with the jack shaft and engaging the pull-up cable, said pivotable arm including a member for engaging the pull-up cable and holding it in tension, and means for engaging the jack shaft to prevent further jack shaft rotation when the pull-up cable becomes slack; and means for preventing the garage door from opening adapted for engagement by the pivotable arm when the garage door is lifted without the drive unit operating.

2. A jack shaft garage door operator for opening and closing a movable garage door according to claim 1 wherein the means for engaging the jack shaft comprises a cross bar.

3. A jack shaft garage door operator for opening and closing a garage door according to claim 1 wherein the means for preventing the garage door from opening comprises a door lock bracket that engages the pivotable arm.

4. A jack shaft garage door operator for opening and closing a garage door according to claim 1 further comprising a shaft lock hub mounted on the jack shaft and rotatable therewith, the shaft lock hub being engaged by the pivotable arm when the cable tension drops.

*5. A jack shaft garage door operator for opening and closing a movable garage door, comprising:*

*a drive unit;*

*a jack shaft coupled to the drive unit to be turned thereby;*

*a pull-up cable drum connected to the jack shaft to be driven thereby;*

*a pull-up cable for connection to a movable garage door and connect to the pull-up cable drum to be raised and lowered thereby;*

*a pivotable arm mounted in proximity with the jack shaft and engaging the pull-up cable, said pivotable arm including a member for engaging the pull-up cable and holding it in tension; and*

*means for preventing the garage door from opening adapted for engagement by the pivotable arm when the garage door is lifted without the drive unit operating.*

*6. A jack shaft garage door operator for opening and closing a movable garage door according to claim 5 wherein the pivotable arm comprises engagement apparatus for engaging the jack shaft to prevent further jack shaft rotation when the pull-up cable becomes slack.*

*7. A jack shaft garage door operator for opening and closing a movable garage door according to claim 6 wherein the engagement apparatus comprises a cross bar.*

*8. A jack shaft garage door operator for opening and closing a garage door according to claim 5 wherein the means for preventing comprises a door lock bracket that engages the pivotable arm.*

*9. A jack shaft garage door operator for opening and closing a garage door according to claim 5 further comprising a shaft lock hub mounted on the jack shaft and rotatable therewith, the shaft lock hub being engaged by the pivotable arm when the cable tension drops.*

* * * * *

UNITED STATES PATENT AND TRADEMARK OFFICE

CERTIFICATE OF CORRECTION

PATENT NO. : RE 40,001 E
APPLICATION NO. : 09/547563
DATED : January 15, 2008
INVENTOR(S) : Mark D. Siegler et al.

It is certified that error appears in the above-identified patent and that said Letters Patent is hereby corrected as shown below:

IN THE CLAIMS:

Claim 5, Column 5, Line 2: Change “connect” to -- connected --.

Signed and Sealed this

Twentieth Day of May, 2008

JON W. DUDAS
*Director of the United States Patent and Trademark Office*